United States Patent
Song et al.

(10) Patent No.: US 11,538,143 B2
(45) Date of Patent: Dec. 27, 2022

(54) FULLY CONVOLUTIONAL TRANSFORMER BASED GENERATIVE ADVERSARIAL NETWORKS

(71) Applicant: NEC Laboratories America, Inc., Princeton, NJ (US)

(72) Inventors: Dongjin Song, Princeton, NJ (US); Yuncong Chen, Plainsboro, NJ (US); Haifeng Chen, West Windsor, NJ (US); Xinyang Feng, New York, NY (US)

(73) Assignee: NEC Corporation

( * ) Notice: Subject to any disclaimer, the term of this patent is extended or adjusted under 35 U.S.C. 154(b) by 250 days.

(21) Appl. No.: 16/662,659

(22) Filed: Oct. 24, 2019

(65) Prior Publication Data

US 2020/0134804 A1 Apr. 30, 2020

Related U.S. Application Data

(60) Provisional application No. 62/751,024, filed on Oct. 26, 2018.

(51) Int. Cl.
| | | |
|---|---|---|
| *G06T 7/00* | (2017.01) | |
| *G06N 3/04* | (2006.01) | |
| *G06N 3/08* | (2006.01) | |
| *G06N 5/04* | (2006.01) | |
| *G06N 20/10* | (2019.01) | |

(Continued)

(52) U.S. Cl.
CPC .......... *G06T 7/0002* (2013.01); *G06K 9/6215* (2013.01); *G06N 3/0454* (2013.01); *G06N 3/084* (2013.01); *G06N 5/046* (2013.01); *G06N 20/10* (2019.01); *G06N 20/20* (2019.01);

(Continued)

(58) Field of Classification Search
CPC ......... G06T 7/0002; G06T 2207/20081; G06T 2207/20084; G06N 3/0454; G06N 3/084; G06N 5/046; G06N 20/10; G06N 20/20; G06N 3/0472; G06N 3/08; G06K 9/6215;

(Continued)

(56) References Cited

U.S. PATENT DOCUMENTS 10,121,104 B1 * 11/2018 Hu ...................... G06N 3/0454
10,839,506 B1 * 11/2020 Raghu .................. G06K 9/4604

(Continued)

OTHER PUBLICATIONS

Wu, H., et al., "A System for Spatiotemporal Anomaly Localization in Surveillance Videos," MM '17: Proceedings of the 25th ACM international conference on Multimedia, Oct. 2017.*

(Continued)

*Primary Examiner* — Xuemei G Chen

(74) *Attorney, Agent, or Firm* — Joseph Kolodka

(57) ABSTRACT

Systems and methods for detecting anomaly in video data are provided. The system includes a generator that receives past video frames and extracts spatio-temporal features of the past video frames and generates frames. The generator includes fully convolutional transformer based generative adversarial networks (FCT-GANs). The system includes an image discriminator that discriminates generated frames and real frames. The system also includes a video discriminator that discriminates generated video and real video. The generator trains a fully convolutional transformer network (FCTN) model and determines an anomaly score of at least one test video based on a prediction residual map from the FCTN model.

20 Claims, 8 Drawing Sheets

(51) Int. Cl.
*G06K 9/62* (2022.01)
*G06N 20/20* (2019.01)

(52) U.S. Cl.
CPC ............... *G06T 2207/20081* (2013.01); *G06T 2207/20084* (2013.01)

(58) Field of Classification Search
CPC . G06K 9/4628; G06K 9/6284; G06K 9/00744
See application file for complete search history.

(56) References Cited

U.S. PATENT DOCUMENTS

| | | | |
|---|---|---|---|
| 10,846,888 B2* | 11/2020 | Kaplanyan | G06N 3/084 |
| 10,896,535 B2* | 1/2021 | Li | G06T 13/40 |
| 2017/0345140 A1* | 11/2017 | Zhang | G06K 9/6271 |
| 2018/0322366 A1* | 11/2018 | Lim | G06K 9/6255 |
| 2019/0057515 A1* | 2/2019 | Teixeira | G06T 7/50 |
| 2019/0114748 A1* | 4/2019 | Lin | G06N 3/0454 |
| 2019/0354629 A1* | 11/2019 | Zavesky | G06N 3/08 |
| 2019/0377047 A1* | 12/2019 | Chen | G01R 33/4818 |
| 2019/0385302 A1* | 12/2019 | Ngo Dinh | G06N 3/08 |
| 2020/0021718 A1* | 1/2020 | Barbu | G06N 3/0445 |
| 2021/0249142 A1* | 8/2021 | Lau | G06T 7/11 |

OTHER PUBLICATIONS

Long, "Fully Convolutional Networks for Semantic Segmentation"; IEEE Conference on CVPR, Nov. 2014 pp. 3431-3440.
Vaswani, "Attention is All You Need", Proceeding of NIPS, Dec. 2017 pp. 6000-6010.
Isola, "Image-to-image Translation with Conditional Adversarial Networks", IEEE Conference on CVPR, Nov. 2016, pp. 5967-6976.

* cited by examiner

FULLY CONVOLUTIONAL TRANSFORMER BASED GENERATIVE ADVERSARIAL NETWORKS

RELATED APPLICATION INFORMATION

This application claims priority to U.S. Provisional Patent Application No. 62/751,024, filed on Oct. 26, 2018, incorporated herein by reference herein its entirety.

BACKGROUND

Technical Field

The present invention relates to conditioned generative adversarial networks (GANs) and more particularly applying GANs to video.

Description of the Related Art

Generative adversarial networks (GANs) are a class of machine learning systems in which neural networks contest with each other. GANs can learn to generate new data with the same statistics as a training set. For example, GANs can generate photographs with authentic characteristics based on training with photographs. GANs can be used for unsupervised, semi-supervised, and fully learning.

SUMMARY

According to an aspect of the present invention, a method is provided for detecting anomaly in video data. The method includes receiving, at a generator, past video frames, wherein the generator includes fully convolutional transformer based generative adversarial networks (FCT-GANs). The method also includes extracting, by the generator, spatio-temporal features of the past video frames and generating frames. The method includes discriminating, by an image discriminator, generated frames and real frames. The method further includes discriminating, by a video discriminator, generated video and real video. The method includes training a fully convolutional transformer network (FCTN) model and determining an anomaly score of test video based on a prediction residual map from the FCTN model.

According to another aspect of the present invention, a system is provided for detecting anomaly in video data. The system includes a generator that receives past video frames and extracts spatio-temporal features of the past video frames and generates frames. The generator includes fully convolutional transformer based generative adversarial networks (FCT-GANs). The system includes an image discriminator that discriminates generated frames and real frames. The system also includes a video discriminator that discriminates generated video and real video. The generator trains a fully convolutional transformer network (FCTN) model and determine san anomaly score of at least one test video based on a prediction residual map from the FCTN model.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
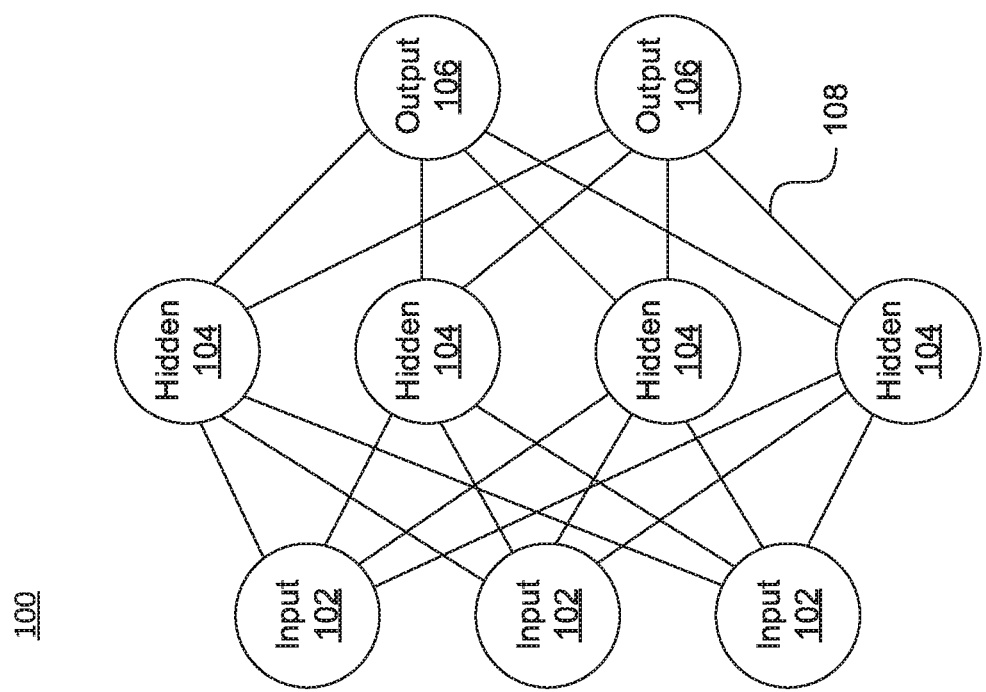
FIG. 1 is a generalized diagram of a neural network, in accordance with an embodiment of the present invention.

In accordance with embodiments of the present invention, systems and methods are provided to/for applying image and video discriminators to ensure generation of realistic and temporally coherent frame representations. The model trained on normal video can be applied on test sets with anomaly, where the deviation of the generated frame from the ground truth indicates the anomaly.

In one embodiment, a system uses a convolutional transformer model to capture spatio-temporal patterns. A dual discriminator adversarial training approach that uses both an image discriminator and a video discriminator is used to train the model. At test time, the system uses prediction error is used to identify abnormal video frames.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. In example embodiments herein, the training data can include video sequences (in which, for example, anomalies, such as those associated with abnormal activity, can be detected). The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
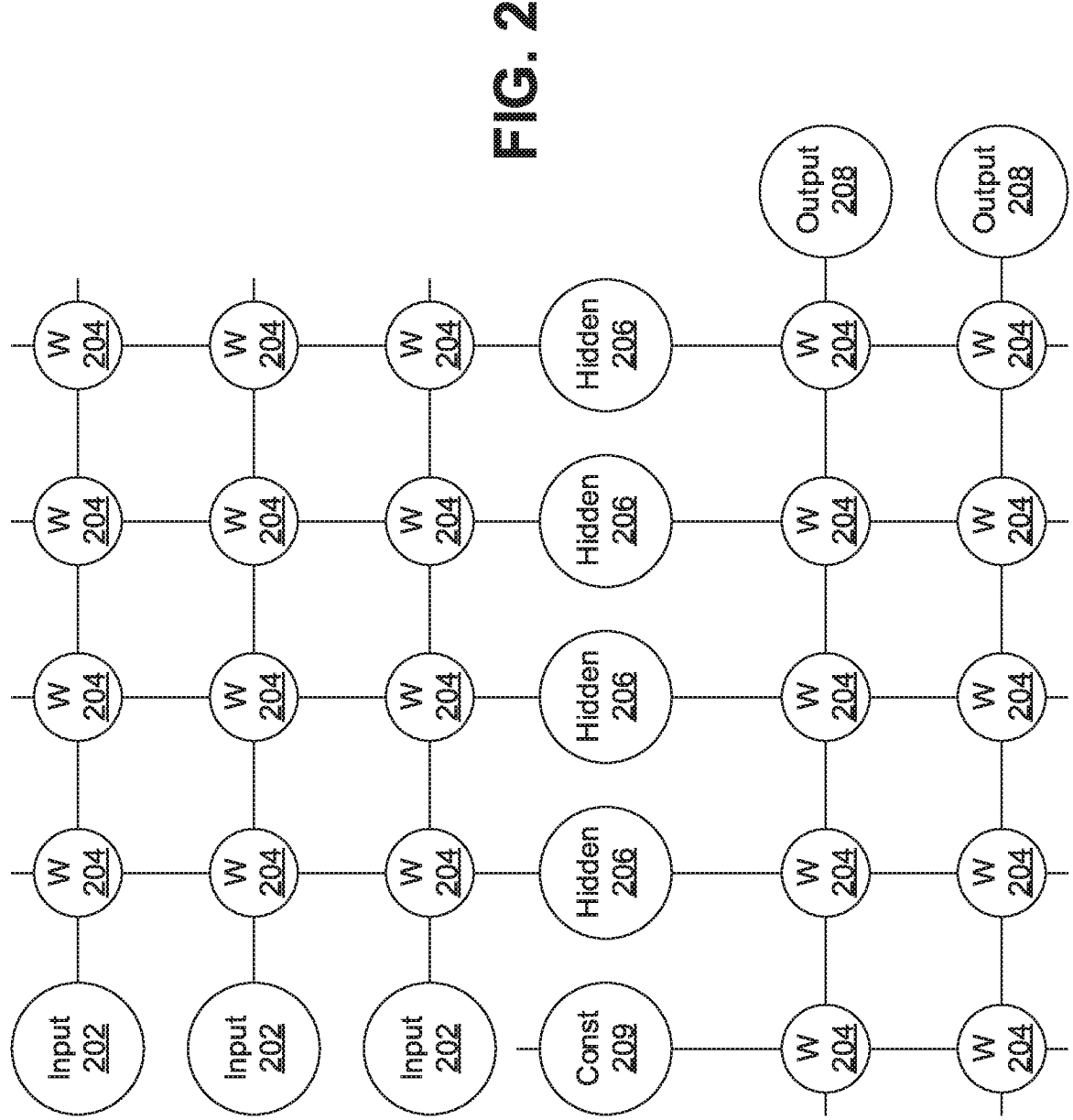
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input' signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A convolutional neural networks (CNN) is a subclass of ANNs which has at least one convolution layer. A CNN includes an input and an output layer, as well as multiple hidden layers. The hidden layers of a CNN include convolutional layers, rectified linear unit (RELU) layer (e.g., activation function), pooling layers, fully connected layers and normalization layers. Convolutional layers apply a convolution operation to the input and pass the result to the next layer. The convolution emulates the response of an individual neuron to visual stimuli.

CNNs can be applied to analyzing visual imagery. CNNs can capture local information (e.g., neighbor pixels in an image or surrounding words in a text) as well as reduce the complexity of a model (to allow, for example, faster training, requirement of fewer samples, and reduction of the chance of overfitting).

CNNs use a variation of multilayer perceptrons designed to use minimal preprocessing. CNNs are also known as shift invariant or space invariant artificial neural networks (SI-ANN), based on their shared-weights architecture and translation invariance characteristics. CNNs can be used for applications in image and video recognition, recommender systems, image classification, medical image analysis, and natural language processing.

The ANN 200 can be applied to implement fully convolutional transformer based generative adversarial networks (FCT-GANs) for anomaly detection, as described with respect to FIG. 3 and system 300 herein below. The text-filter conditioning scheme that is applied to many different scales of feature representations of video frames. At test time, a prediction error can be used to identify abnormal video frames.

Figure 3:
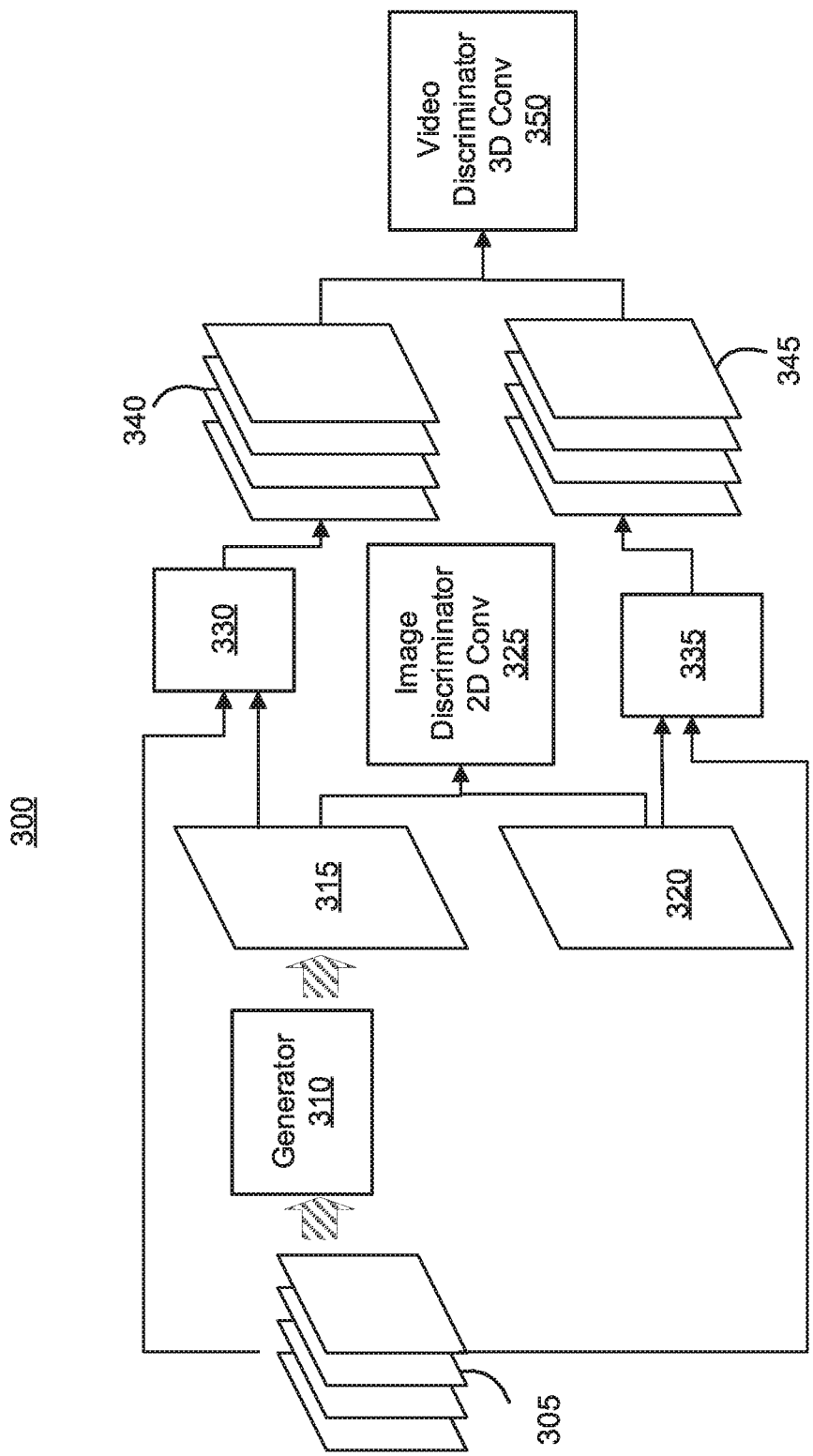
FIG. 3 is a block diagram illustrating a system for implementing fully convolutional transformer based generative adversarial networks (FCT-GANs) for anomaly detection, in accordance with an embodiment of the present invention.

Referring now to FIG. 3, a system for implementing fully convolutional transformer based generative adversarial networks (FCT-GANs) for anomaly detection 300 is illustratively depicted in accordance with an embodiment of the present invention.

The example embodiments can be implemented to perform automatic video anomaly detection by learning a generative model on the normal video sequences (for example, which can be easily collected and evaluated). At test stage, the systems described herein use the learned model to represent the test video sequence. As normal and abnormal video sequences are assumed to be from different distributions, the model trained on normal video sequences cannot represent the "unseen" abnormal video patterns with fidelity as high as normal video sequences and thus results in larger representation errors.

As shown in FIG. 3, system 300 includes an architecture in which past frames (for example, images) 305 (for example, t−T+1, . . . t, frames that have been processed/viewed, etc.) are input to a generator (for example, a convolutional transformer, FCT-GANs) 310. t represents a current frame at a time t and T represents the length of the video clip. The generator 310 outputs generated frames (t+1) 315, for example based on a process as described with respect to FIG. 4 herein below. The generated frames 315 (t+1) and a ground truth (t) 320 are input to an image discriminator (that performs image two-dimensional (2D) convolution) 325. The past frames 305 (t−T+1, . . . t) and the generated frames 315 (t+1) (for example, real and fake images) are added to stacks 330 (in which images are stacked together with pre-computed optical flow maps in channel dimension as input) and the resulting images 340 are input to a video discriminator 350. The past frames 305 and the ground truth 320 are added to stacks 335 and the resulting images 345 are input to the video discriminator 350. The optical flow maps consist of one horizontal component, one vertical component and an optical flow magnitude component. Note that the optical flow map is computed from the previous image 305 and current image, and thus does not contain future frame information.

Given an input representation of video clip of length T, e.g., $I=(I_{t-T+1}, \ldots, I_t) \in \mathbb{R}^{h \times w \times c \times T}$, where h is the height, w is the width, c is the number of channels, the system 300 predicts the (t+1)-th frame as $\hat{I}_{t+1} \in \mathbb{R}^{h \times w \times c}$ and identifies abnormal activities based upon the prediction error, e.g., $e_t = \sum_{i=1}^{c} \|\hat{I}_{:,:,i,t+1} - I_{:,:,i,t+1}\|_F^2$, where $I_{:,:,i,t+1} \in \mathbb{R}^{h \times w}$.

According to example embodiments, the generator 310 implements fully convolutional transformer based generative adversarial networks (FCT-GANs) that extract spatio-temporal features (for example, efficiently). Self-attention can be defined as an attention mechanism relating different positions of a single sequence in order to compute a representation of the sequence, in which the keys, values, and queries are from the same set of features. The generator 310 takes past frames 305 as inputs and generates a (for example, predicted) future frame 315. The future frame 315 can include an extrapolated frame consistent with a sequence of past frames. For example, the generator 310 can extract spatio-temporal features of video frames from t-T to t−1 efficiently and generate a future frame at time t.

The image discriminator 325 discriminates the generated frame and real frame. For example, the image discriminator 325 can output a single number, for example, between 0 and 1, representing "how realistic" the image looks. The image discriminator 325 can include a (for example, frame level in a frame by frame video) convolutional filter generated to classify images as true or false.

The video discriminator 350 discriminates the generated and real video. The video discriminator 350 can include a video level convolutional filter that classifies video (for example, of a frame by frame video) as true or false.

Specific to image generation in videos, the video discriminator 350 takes conditions into consideration in a similar manner as conditional GANs framework used in image-to-image translation, where the target domain image generation is conditioned on the source domain image. In processing video, the example embodiments can condition on the neighboring frames of the generated frame, where the neighboring frames can be understood as the global contextual information.

The training process implemented in the system 300 can follow GANs training protocol. For example, the GANs training process trains both the discriminator and the generator model in parallel (for both the image discriminator 325 and the video discriminator 350). At training stage, the system can train a model on normal video sequences by doing one-step future frame prediction. This way, the model (and system 300) can learn the regular spatio-temporal pattern. The system 300 can add adversarial loss on both the generated frame and the generated video (in contrast to use of purely reconstruction error-based loss).

The trained generator 310 can then be applied to test videos. For example, the generator 310 can receive test videos and determine whether the test videos include anomalies. For example, at a testing stage, trained generator 310 can predict frames based on a particular frame and use the prediction error as an indicator of anomaly.

The prediction residual map can be used to generate an anomaly score. The prediction residual map in this instance is a difference of the predicted map and the ground truth observation. In example embodiments, given a video sequence, the system 300 can perform surveillance to detect abnormal event occurrence accurately (and thereby reducing false alarm). For example, an anomaly score can be generated for video received by the system 300 and compared to a threshold to determine whether an abnormal event has been captured by the video. The system 300 can be applied with limited information about the anomaly.

The effectiveness of anomaly detection depends on a gap between the capability of modeling normal video and the generalization capability to abnormal video. The example embodiments described herein beneficially increase the task difficulty by using future frame prediction where the model not only needs to reconstruct the input but also needs to extrapolate in time.

The system 300 implements conditional generative adversarial networks (cGANs) based processes incorporating an adversarial loss (in contrast to approaches based on reconstruction loss only) as the possible states of prediction are much larger than those based on reconstruction loss. The systems described herein can implement mean squared error (MSE) based processes to generate more blurred images because the MSE loss encourages the predicted map to collapse all possibilities.

The system 300 implements a self-attentive and fully convolutional transformer based generative adversarial networks (FCT-GANs) framework to perform anomaly detection. The system 300 can detect the occurrence of abnormal event in the video sequence.

According to example embodiments, the system 300 can implement FCT-GANs to model the normal background and motion patterns (found in video) accurately and efficiently thanks to the FCT-GANs generator and dual adversarial loss on image and video. Further, the system 300 can implement FCT-GANs to predict one frame ahead accurately. Finally, FCT-GANs can generate anomaly scores accurately based upon prediction error.

Figure 4:
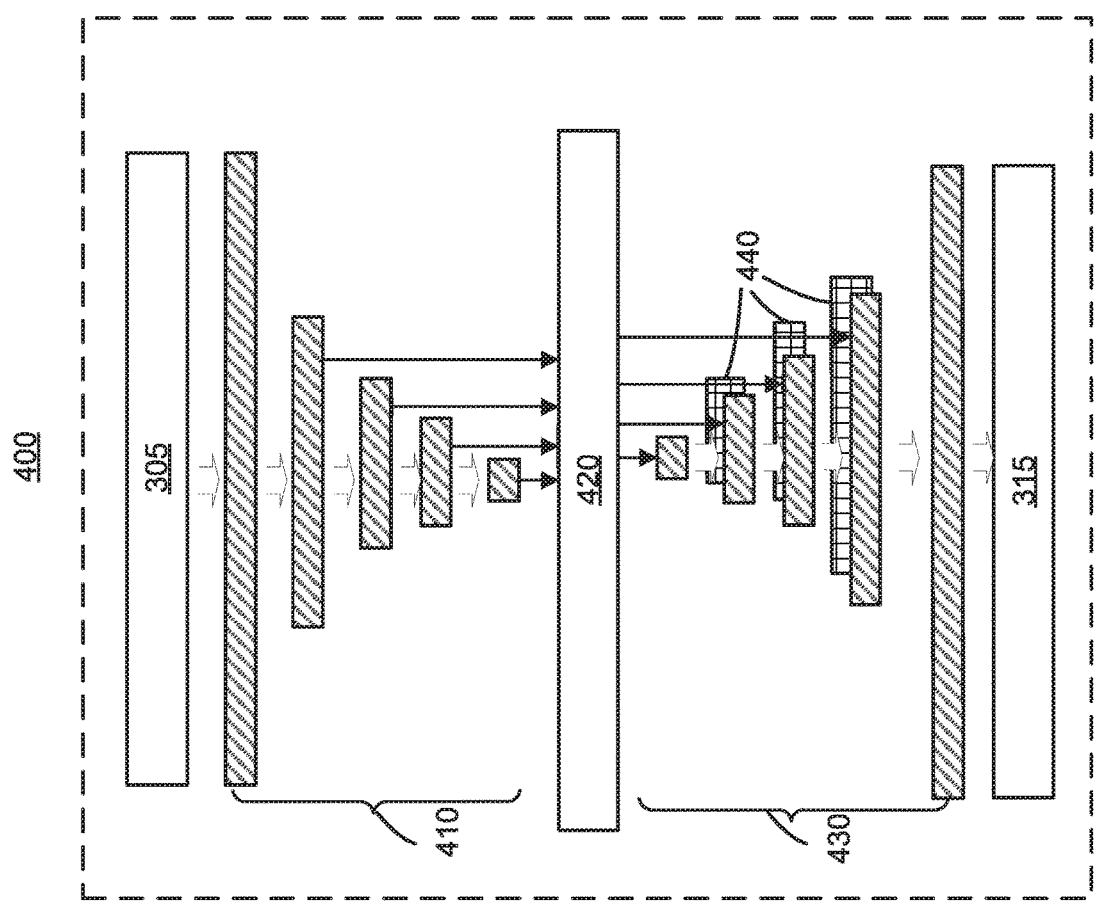
FIG. 4 is a block diagram illustrating components of a generator that includes a convolutional transformer, in accordance with an embodiment of the present invention.

Referring now to FIG. 4, components of a generator that includes a convolutional transformer, is illustratively depicted in accordance with an embodiment of the present invention.

Generator 310 implements a convolutional transformer model that includes three modules: a convolutional encoder 410, temporal self-attention module 420, and convolutional decoder 430. Generator 310 employs fully convolutional networks to encode spatial information, temporal self-attention module to integrate temporal information, and reconstruct video from the spatio-temporally integrated features.

Fully convolutional encoder 410 extracts spatial features from each frame of the video. According to an example embodiment, each frame of the video is first resized to 256×256 and then fed into the convolutional encoder 410. In example embodiments, the convolutional encoder 410 consists of 5 convolutional blocks (note that in other embodiments, less or more convolutional blocks can be implemented). All the convolutional kernels can be set as 3×3 pixels. For brevity, a convolutional layer can be denoted with stride s and number of filters n as $Conv_{s,n}$, a batch normalization layer as BN, a scaled exponential linear unit as scaled exponential linear unit (SELU), and a dropout operation with dropout ratio r as $dropout_r$. An example structure of the convolutional encoder 410 is: [$Conv_{1,64}$-SELU-BN]-[$Conv_{2,64}$-SELU-BN-$Conv_{1,64}$-SELU]-[$COnV_{2,128}$-SELU-BN-$Conv_{1,128}$-SELU]-[$Conv_{2,256}$-SELU-BN-$dropout_{0:25}$-$Conv_{1,256\text{-}SELU]\text{-}Conv}$2;256-SELU-BN-$dropout_{0:25}$-Conv1,256-SELU], where each [•] represents a convolutional block.

The lth convolutional block is denoted as convl. At convl, the height, width, and number of feature maps $F_{t-1}^l \in \mathbb{R}^{h_l \times w_l \times c_l}$, $i \in [0, \ldots, T-11]$ for the input to the self-attention module are $h_l$, $w_l$, and $c_l$, respectively.

Generator 310 further integrates the spatial feature maps using the temporal self-attention module 420 to encode the temporal information.

Figure 5:
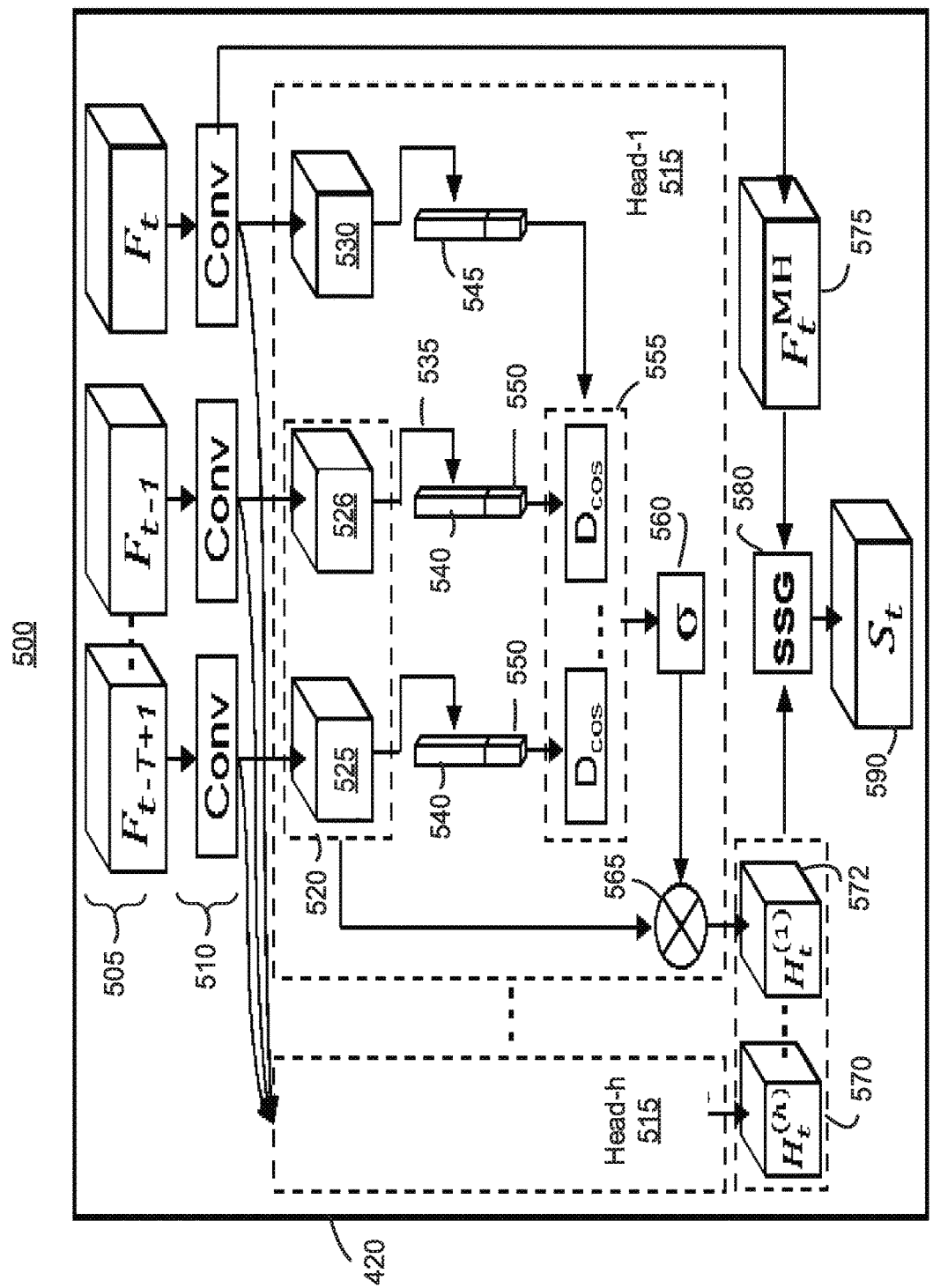
FIG. 5 is a block diagram illustrating an architecture of a temporal self-attention module, in accordance with an embodiment of the present invention.

Generator 310 can implement temporal self-attention 420 to facilitate learning of dependencies between various representations of a node (for example, images) across different time steps. Temporal self-attention 420 explicitly encodes the temporal information in the video sequence, extending self-attention mechanism in the transformer model modelling the temporal information of the spatial feature maps generated by the fully convolutional encoder 410 at each level. Temporal self-attention 420 is applied to all layers. An illustration of the multihead temporal self-attention module is shown in FIG. 5.

In example embodiments, the outputs of the temporal self-attention module 420 $S_t$ (440) are fed into the convolutional decoder 430. The convolutional decoder 430 reconstructs (for example, predicts) the video frame using (for example, 4) transposed convolution layers with stride 2 on the feature maps in a reverse order of the convolutional encoder with 256, 128, 64, 64 filters respectively. Stride is the number of pixels shifts over the input matrix. The fully scaled feature maps then go through one $Conv_{1,32}$-BN-SELU block, and one convolutional layer with c kernels of size 1×1 that maps to the same size of channels c in the input.

In order to predict finer details, generator 310 utilize a skip connection to connect the spatio-temporally integrated maps at each level of the fully convolutional encoder to the corresponding level of the convolutional decoder (as illustrated in FIG. 3), which allows the model to further fine tune the predicted frames.

The generator 310 then outputs a generated frame 315. The temporal self-attention module 420 can be implemented as described herein below with respect to FIG. 5.

Referring now to FIG. 5, an architecture 500 of a temporal self-attention module 420, is illustratively depicted in accordance with example embodiments of the present invention.

As shown in FIG. 5, the temporal self-attention module 420 can implement a multi-head self-attention mechanism. The multi-head self-attention mechanism is applied on the feature maps $F_t$. The feature maps are transformed to multi-head $F_t^{MH}$ via a convolutional operation; within each head (for example, heads 515-1 to 515-h). Temporal self-attention module 420 applies a global average pooling (GAP) 535 operation on $F_t^{(k)}$ (for example, $f_{t-T+1}^{(1)}$ (525), $f_{t-}^{(1)}$ (526) to $f_t^{(1)}$ (530)) to aggregate over spatial dimension and concatenates the positional encoding (PE) vector 550. Temporal self-attention module 420 then compares the similarity Dcos 555 between query q(tk) (545) and memory m(tk) (540) feature vectors and generates the attention weights by normalizing across time steps using a softmax function σ (560). The attended feature map $H_t^{(1)}$ 572 is a weight average of the feature maps at different time steps. The final attended map $H_t^{MH}$ (570) is' the concatenation over all the heads. The final integrated map St (590) is a weighted average of the query $F_t^{MH}$ (575) and the attended feature maps according to a spatial selective gate (SSG) (580).

As shown in FIG. 5, architecture 500 includes feature maps 505 (shown, by way of example, as $F_{t-T+1}, \ldots, F_{t-1}$, to $F_t$), that are transformed to multi-head (multiple heads 515, shown by way of example, as Head-1 to Head-h) via a convolutional operation 510.

With regard to global average pooling (GAP) 535, given a set of spatial feature maps at different time steps, temporal self-attention module 420 can use a global average pooling (GAP) operation to extract a global representation of the feature maps by aggregating over the spatial dimensions:

$$f_t = \frac{1}{h_l \cdot w_l} \sum_{(x,y)} F_{x,y,:,t}. \qquad \text{Eqn. (1)}$$

where $F_{x,y,:,t} \in \mathbb{R}^{c_l}$ denotes the feature vector at the spatial position (x; y) at time t. Subsequently, the feature vector in current time step ft can be used as part of the query and each historical feature vector $f_{t-i}, i \in [1, T-1]$ can be used as part of the key to index spatial feature maps.

With regard to positional encoding, different from sequence models such as LSTM, self-attention does not model sequential information inherently, therefore temporal self-attention module 420 incorporates temporal positional information into the model. For this purpose, temporal self-attention module 420 generates a positional encoding vector $PE \in \mathbb{R}^{d_p}$ by using the following positional encoding scheme:

$$PE_{p,2i} = \sin(p/10000^{2i/d_p})$$

$$PE_{p,2i+1} = \cos(p/10000^{2i/d_p}) \qquad \text{Eqn. (2)}.$$

where, $d_p$ denotes the dimension of PE, p denotes the temporal position and $i \in [0, \ldots, (d_p/2-1)]$ denotes the index of the dimension. Empirically, temporal self-attention module 420 selects $d_p = 8$.

Temporal self-attention module 420 concatenates the positional encoding vector with the aggregated spatial feature vector across different time steps and uses these concatenated vectors as the queries and keys. Temporal self-attention module 420 also uses the feature maps as the values in the setting of self-attention mechanism. For each query frame at time t, the current concatenated feature vector $q_t = [f_t; PE] \in \mathbb{R}^{c_l+d_p}$ is used as query, and compared to the feature vector of each frame from the input video clip $m_{t-i} = [f_{t-i}; \in \mathbb{R}^{c_l+d_p}, i \in [1, \ldots, T-1]$ using cosine similarity:

$$D(q_t, m_{t-i}) = \frac{q_t \cdot m_{t-i}}{\|q_t\| \|m_{t-i}\|}. \qquad \text{Eqn. (3)}$$

The similarities are compared between the query feature vector and memory vector to generate attention weights by a softmax function. Based on the similarity between $q_t$ and $m_{t-i}$, temporal self-attention module 420 can generate the normalized attention weights $a_{t-i} \in \mathbb{R}$ across the temporal dimension using a softmax function:

$$a_{t,t-i} = \frac{\exp(\beta D(q_t, m_{t-i}))}{\sum_{j \in [2 \ldots T-1]} \exp(\beta D(q_t, m_{t-j}))}. \qquad \text{Eqn. (4)}$$

where a positive temperature variable $\beta$ is introduced to sharpen the level of focus in the softmax function and is automatically learned in the model through a single hidden densely-connected layer with the query as the input.

The attended feature map is a weighted average of the feature maps at different time steps and the final attended map is the concatenation over all the heads. The attended feature map is a weighted average of the query and the attended feature maps via spatial selection gate. The final attended feature maps Ht are a weighted summation of all feature maps F using the attention weights as calculated in Eq. (4), i.e.:

$$H_t = \sum_{i \in [1, \ldots, T-1]} a_{t,t-i} \cdot F_{t-i}. \qquad \text{Eqn. (5)}$$

Multi-head temporal self-attention enables the model to jointly attend to information from different representation subspaces at different positions. In example embodiments described herein, temporal self-attention module 420 first maps the spatial feature maps from the convolutional encoder to $n_h = 8$ groups, each using 32 convolutional kernels of size 1×1. For each group of generated feature maps with dimension $c_h = 32$, temporal self-attention module 420 performs the single head self-attention as described herein above and generates attended feature maps for head k as $H_t^{(k)}$:

$$H_t^{(k)} = \sum_{i \in [1, \ldots, T-1]} a_{t,t-i}^{(k)} \cdot F_{t-i}^{(k)}. \qquad \text{Eqn. (6)}$$

Where $F_{t-1}^{(k)} \in \mathbb{R}^{h_l \times w_l \times c_h}$ is the tramnformed feature map at frame t−i for head k, $a_{t,t-i}^{(k)}$ is the corresponding attention weight. The final multi-head attended feature map $H_t^{MH} \in \mathbb{R}^{h_l \times w_l \times c_h}$ the concatenation of the attended feature maps from all the heads along the channel dimension:

$$H_t^{MH} = \text{Concat}(H_t^{(1)}, \ldots, H_t^{(n_h)}) \qquad \text{Eqn. (7)}.$$

In this way, the final attended feature maps not only integrate spatial information from the fully convolutional encoder, but also capture temporal information from multi-head temporal self-attention process.

Although the multi-head temporal self-attention process extends the self-attention mechanism to the temporal modeling of 2D image feature maps, however, this results in the loss of fine-grained spatial resolution due to the global average pooling (GAP) operation. To compensate for this, temporal self-attention module 420 implements spatial selective gate (SSG) 580, which can also be viewed as a spatial attention mechanism to integrate the current and historical information. The attended feature maps from the temporal self-attention process and the feature maps of the current query are concatenated, on which temporal self-attention module 420 learns a spatial selective gate using a sub-network $N_{SSG}$ with structure: $Conv_{1,256}$-BN-SELU-$Conv_{1,256}$-BN-SELU-$Conv_{1,256}$-BN-SELU-$Conv_{1,256}$-$Conv_{1,256}$-Sigmoid. The final output is a pixel-wise weighted average of the attended maps HtMH and the current query's multi-head transformed feature maps $F_t^{MH} \in \mathbb{R}^{h_l \times w_l \times (c_h \cdot h_h)}$, according to the spatial selective gate SSG (580):

$$S_t = SSG \circ F_t^{MH} + (1 - SSG) \circ H_t^{MH} \qquad \text{Eqn. (8)}.$$

where ∘ denotes element-wise multiplication.

According to example embodiments, temporal self-attention module 420 integrates temporal information at multiple abstract levels and spatial scales. Temporal self-attention module 420 can add spatial selective gate at each level of temporal self-attention module. As the spatial dimensions are larger at shallow layers and temporal self-attention module 420 targets including contextual information while preserving the spatial resolution, temporal self-attention module 420 can use dilated convolution with different dilatation factors at the 4 convolutional blocks in the sub-network $N_{SSG}$, specifically from conv2 to conv5, the dilation factors are (1,2,4,1), (1,2,2,1), (1,1,2,1), (1,1,1,1). Note that SSG is computationally more efficient than directly forwarding the concatenated feature maps to the convolutional decoder.

Figure 6:
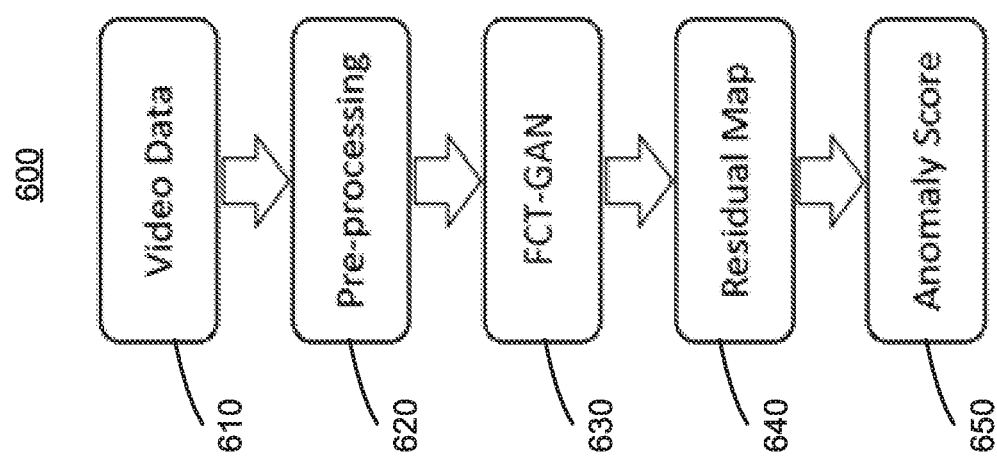
FIG. 6 is a flow diagram illustrating a process of implementing fully convolutional transformer generative adversarial networks (GANs) for anomaly detection, in accordance with an embodiment of the present invention.

FIG. 6 is a flow diagram illustrating a process 600 of implementing a self-attentive and fully convolutional GAN for anomaly detection, in accordance with the present invention.

At block 610, system 300 receives input video data. The video data can include frames in a sequence. The input video data can include, for example, surveillance video of human activities and/or behaviors.

At block 620, system 300 preprocesses the input video (for example, by accessing the optical flow and normalizing the range of the input). For example, system 300 preprocessing the input video can include obtaining an optical flow of each frame. The optical flow can include the pattern of apparent motion of objects, surfaces, and edges in a visual scene caused by the relative motion between an observer and a scene.

At block 630, system 300 processes the input video data using fully convolutional transformer based generative adversarial networks (FCT-GANs) based upon normal video segments, such as described herein above with respect to FIGS. 3 to 5. FCT-GANs model the normal appearance and motion patterns accurately and efficiently.

At block 640, system 300 predicts video frames and generates prediction residual maps. FCT-GANs can predict one frame ahead accurately.

At block 650, system 300 uses the prediction residual map to generate anomaly scores for the video. FCT-GANs can generate anomaly scores accurately based upon prediction residual.

Figure 7:
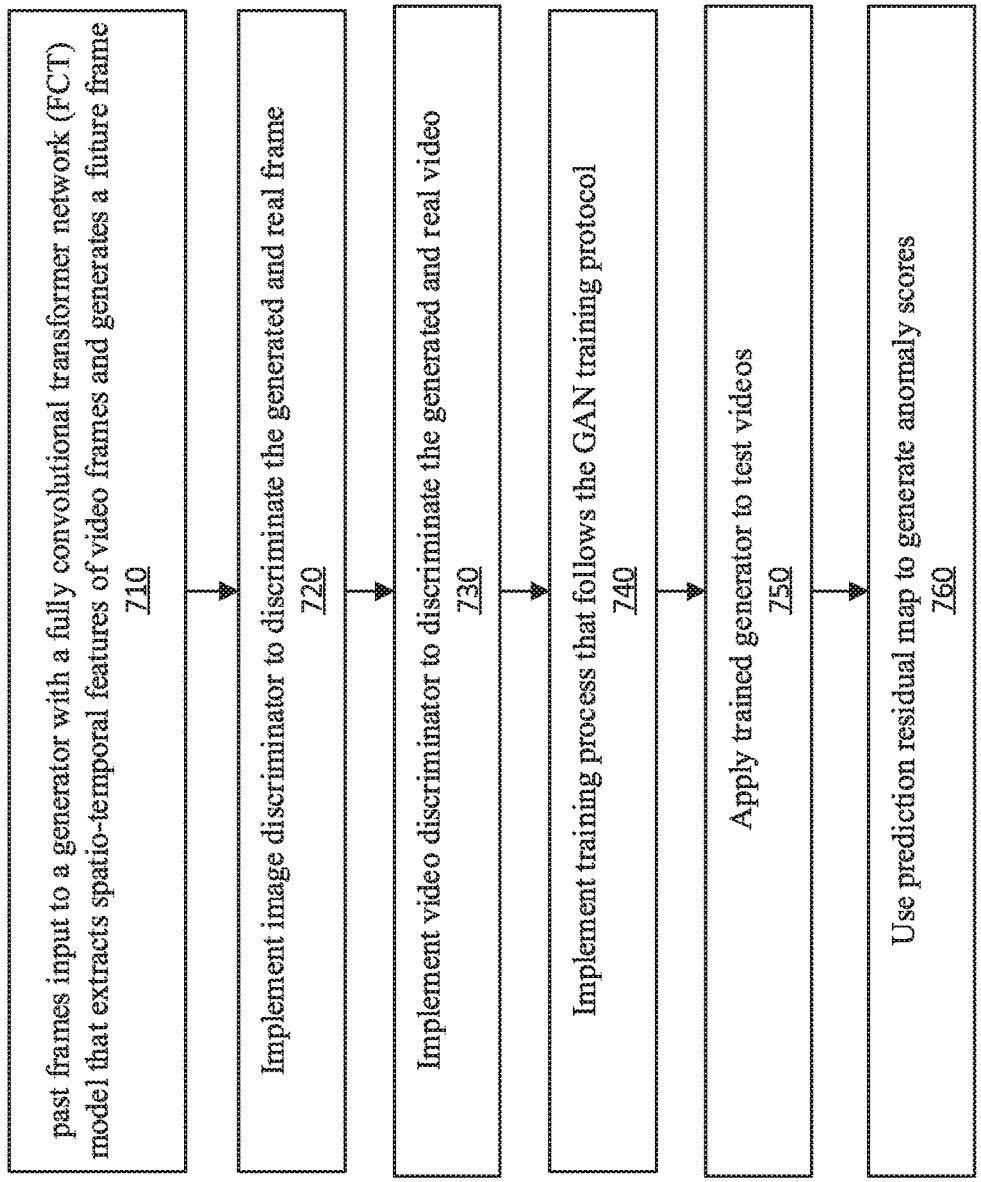
FIG. 7 is a block diagram illustrating a method of implementing a trained conditional video generator, in accordance with an embodiment of the present invention.

FIG. 7 is a flow diagram illustrating a method 700 of implementing a trained conditional video generator, in accordance with the present invention.

At block 710, past frames 305 are input to a generator 310, such as a fully convolutional transformer network (FCT) model described with respect to FIG. 3 herein above, which extracts spatio-temporal features of video frames from t-T to t−1 efficiently and generate a future frame 315 at time t.

At block 720, system 300 implements an image discriminator 325 to discriminate the generated 315 and real frame 320.

At block 730, system 300 implements a video discriminator 350 to discriminate the generated 340 and real video 345.

At block 740, system 300 implements a training process (for generator, image discriminator and video discriminator) that follows the GANs training protocol. The GANs training protocol includes training both the discriminator and the generator model in parallel.

At block 750, system 300 applies the trained generator to test videos. The system 300 generates a residual map based on the application of the generator to the test videos.

At block 760, system 300 uses the prediction residual map to generate anomaly scores.

Figure 8:
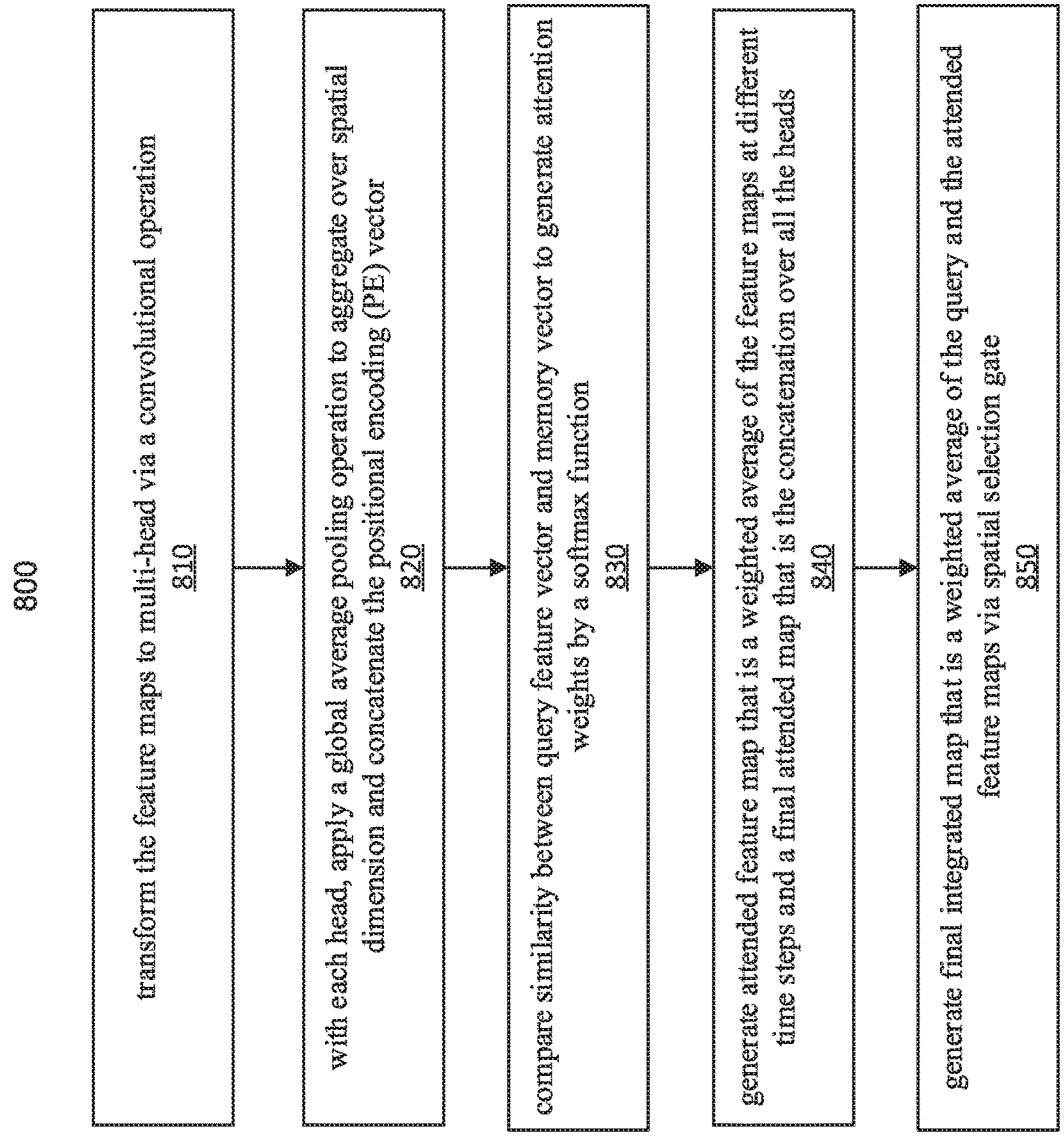
FIG. 8 is a flow diagram illustrating a method of implementing temporal self-attention, in accordance with an embodiment of the present invention.

FIG. 8 is a flow diagram illustrating a method 800 of implementing temporal self-attention, in accordance with aspects of the present invention.

At block 810, temporal self-attention module 420 transforms the feature maps to multi-head via a convolutional operation, such as described herein above with respect to FIG. 5.

At block 820, with each head, temporal self-attention module 420 applies a global average pooling operation to aggregate over spatial dimension and concatenate the positional encoding (PE) vector.

At block 830, temporal self-attention module 420 compares the similarity between the query feature vector and memory vector to generate attention weights by a softmax function.

At block 840, temporal self-attention module 420 generates an attended feature map that is a weighted average of the feature maps at different time steps and a final attended map that is the concatenation (570) over all the heads.

At block 850, temporal self-attention module 420 generates a final integrated map $S_t$ (590) that is a weighted average of the query $F_t^{MH}$ (575) and the attended feature maps via spatial selection gate (SSG 580).

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for detecting anomaly in video data, comprising:
a generator to receive past video frames and to extract spatio-temporal features of the past video frames and generate at least one frame, wherein the generator includes fully convolutional transformer based generative adversarial networks (FCT-GANs);
an image discriminator configured to discriminate at least one generated frame and at least one real frame of the past video frames; and
a video discriminator configured to discriminate at least one generated video and at least one real video, wherein the at least one real video includes, the past video frames and at least one future frame,
Wherein the generator is further configured to train a fully convolutional transformer network (FCTN) model and determine an anomaly score of at least one test video based on a prediction residual map from the FCTN model.

2. The system as recited in claim 1, wherein the system is further configured to:
pre-process the past video frames to obtain an optical flow of each past, video frame.

3. The system as recited in claim 1, wherein, when training the FCTN model, the generator is further configured to:
train the FCTN model based on a generative adversarial network (GAN) protocol.

4. The system as recited in claim 1, wherein the image discriminator and the video discriminator are further configured to add adversarial loss on both the at least one generated frame and the at least one generated video.

5. The system as recited in claim 1, wherein the generator farther comprises at least one convolutional transformer.

6. The system as recited in claim 5, wherein the convolutional transformer is further configured to:
transform at least one feature map to multi-head via a convolutional operation.

7. The system as recited in claim 6, wherein the convolutional transformer is further configured to:
for each head of the multi-head, apply a global average pooling to aggregate over spatial dimension and concatenate a positional encoding (PE) vector.

8. The system as recited in claim 6, wherein the convolutional transformer is further configured to:
compare a similarity between at least one query feature vector and at least one memory vector to generate attention weights by a softmax function.

9. The system as recited in claim 8, wherein the convolutional transformer is further configured to:
determine at least one attended feature map as a weighted average of the at least one feature map at different time steps; and
determine a final attended map as a concatenation over all heads.

10. The system as recited in claim 9, wherein the convolutional transformer is further configured to:
determine an attended feature map as a weighted average of the at least one query feature vector and the at least one attended feature map via a spatial selection gate.

11. A method for detecting anomaly in video data, comprising:
receiving, at a generator, past video frames, Wherein the generator includes fully convolutional transformer based generative adversarial networks (FCT-GANs)
extracting, by the generator, spatio-temporal features of the past video frames and generating at least one frame;
discriminating, by an image discriminator, at least one generated frame and at least one real frame of the past video frames;
discriminating, by a video discriminator, at least one generated video and at least one real video, wherein the at least one real video includes the past video frames and at least one future frame;
training a fully convolutional transformer network (FCTN) model; and
determining an anomaly score of at least one test video based on a prediction residual map from the FCTN model.

12. The method as recited in claim 11, further comprising:
pre-processing the past video frames to obtain an optical flow of each past video frame.

13. The method as recited in claim 11, further comprising:
training the FCTN model based on a generative adversarial network (GANs) protocol.

14. The method as recited in claim 11, further comprising:
adding adversarial loss on both the at least one generated frame and the at least one generated video.

15. The method as recited in claim 11, wherein the generator further comprises at least one convolutional transformer, further comprising:
transforming at least one feature map to multi-head via a convolutional operation.

16. The method as recited in claim 15, further comprising;
for each head of the multi-head, applying a global average pooling to aggregate over spatial dimension and concatenate a positional encoding (PE) vector.

17. The method as recited in claim 15, further comprising:
comparing a similarity between at least one query feature vector and at least one memory vector to generate attention weights by a softmax function.

18. The method as recited in claim 17, further comprising:
determining at least one attended feature map as a weighted average of the at least one feature map at different time steps; and
determining a final attended map as a concatenation over heads.

19. The method as recited in claim 18, further comprising:
determining an attended feature map as a weighted average of the at least one query feature vector and the at least one attended feature map via a spatial selection gate.

20. A computer program product for detecting anomaly in video data, the computer program product comprising a non-transitory computer readable storage medium having program instructions embodied therewith, the program instructions executable by a computing device to cause the computing device to perform the method comprising:
receiving, at a generator, past video frames, wherein the generator includes fill r convolutional transformer based generative adversarial networks (FCT-GANs);
extracting, by the generator, spatio-temporal features of the past video frames and generating at least one frame;
discriminating, by an image discriminator, at least one generated frame and at least one real frame of the past video frames;

discriminating, by a video discriminator, at least one generated video and at least one real video, wherein the at least one real video includes the past video frames and at least one future frame;

training a fully convolutional transformer network (FCTN) model; and determining an anomaly score of at least one test video based on a prediction residual map from the model.

* * * * *